C. M. MOTTE.
MULTIPLE PLOW.
APPLICATION FILED MAY 25, 1918.
1,310,539.
Patented July 22, 1919.
3 SHEETS—SHEET 1.
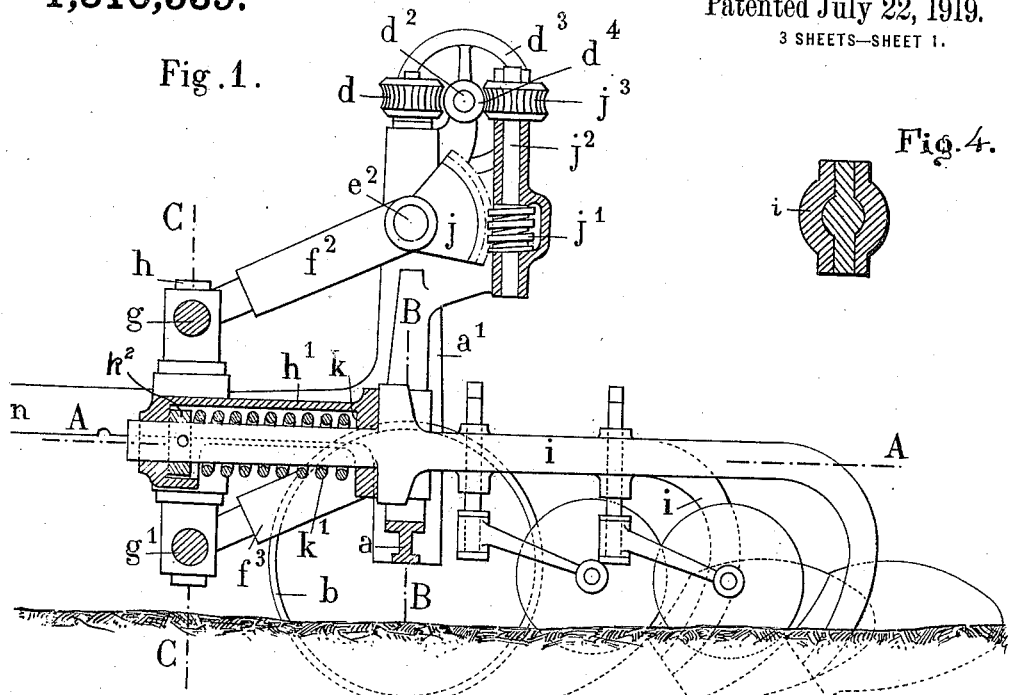
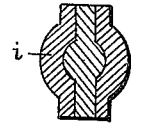
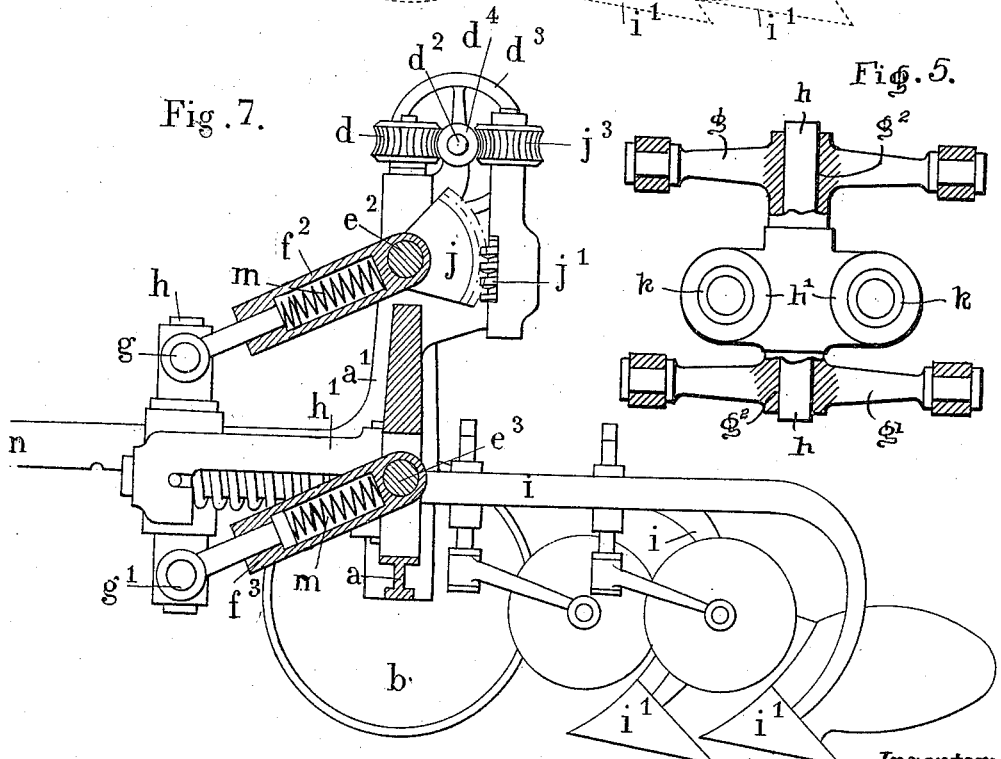
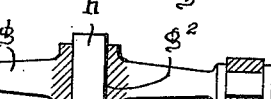

C. M. MOTTE.
MULTIPLE PLOW.
APPLICATION FILED MAY 25, 1918.
1,310,539.
Patented July 22, 1919.
3 SHEETS—SHEET 2.
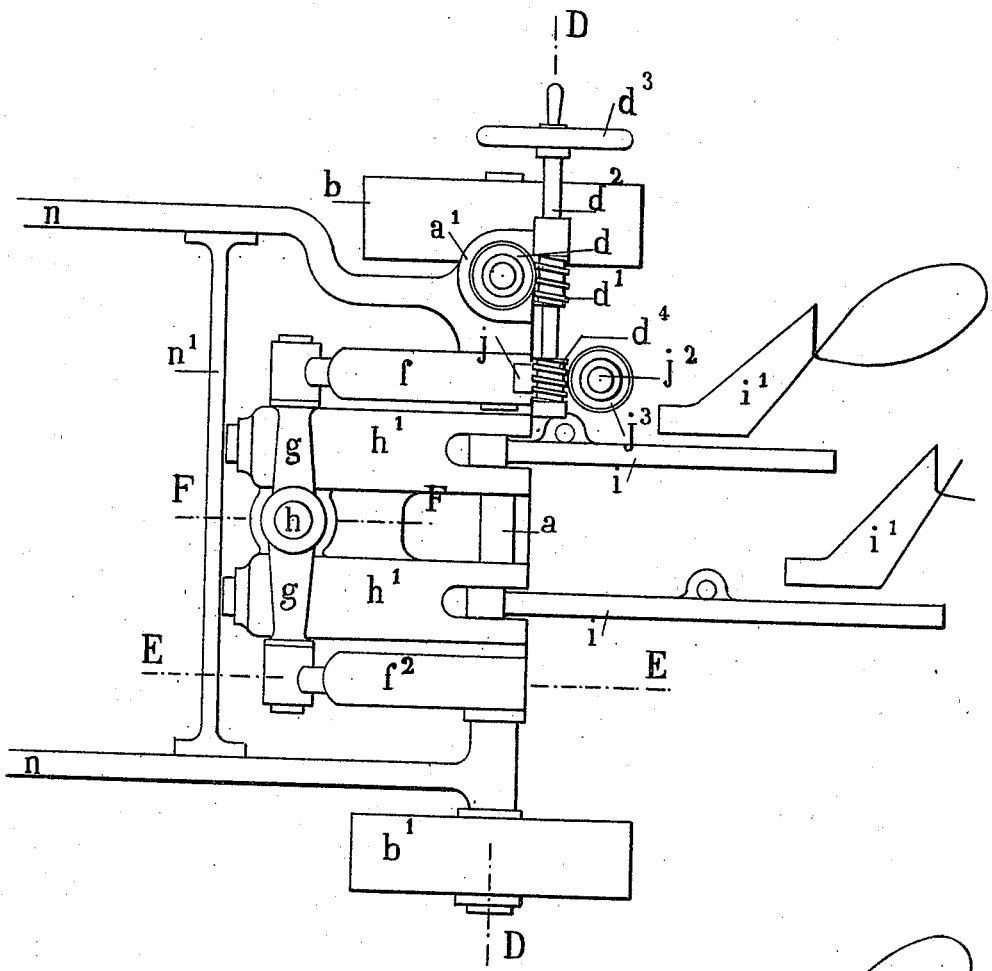
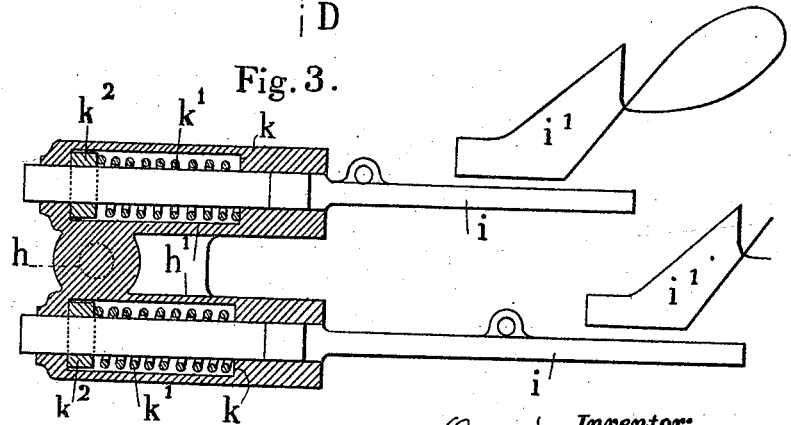

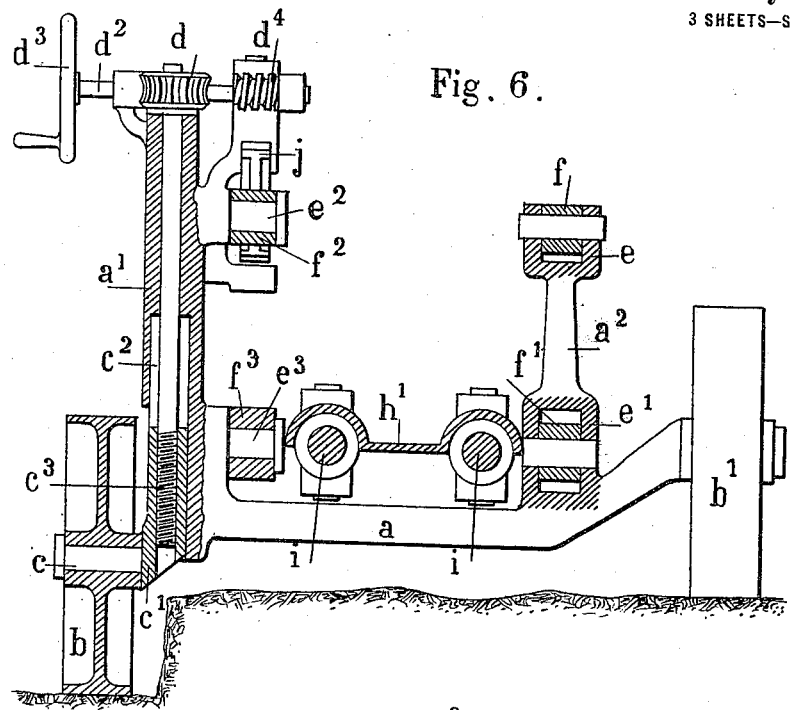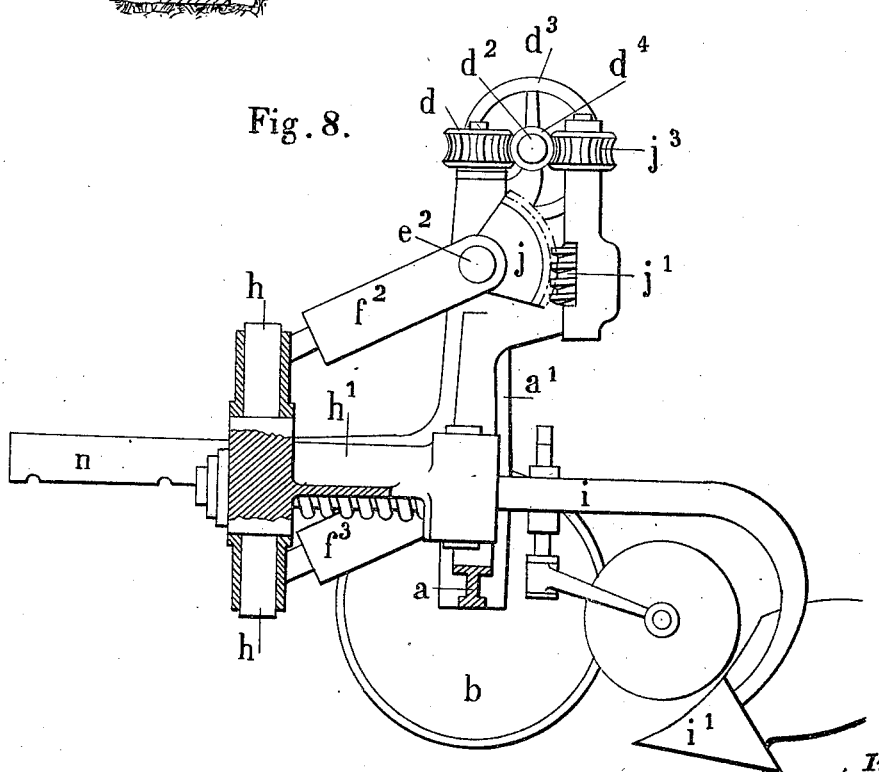

UNITED STATES PATENT OFFICE.

CHARLES MARIUS MOTTE, OF PARIS, FRANCE.

MULTIPLE PLOW.

1,310,539.     Specification of Letters Patent.     Patented July 22, 1919.

Application filed May 25, 1918. Serial No. 236,635.

*To all whom it may concern:*

Be it known that I, CHARLES MARIUS MOTTE, of No. 53 Avenue Secretan, Paris, France, engineer, have invented Multiple Plows, of which the following is a full, clear, and exact description.

The present multiple plows, whether drawn by mechanical or by animal traction are of almost the same type, and the method of coupling them to the draw bar is substantially of the same nature.

In order to diminish the force required for starting, there is sometimes arranged, at one of the extremities of the cable or chain connecting the plow to the tractor, a spring working by tension or by compression. This device is capable of giving good results in single frame plows, but with multiple plows the advantages of such a traction-damper are almost useless.

In point of fact, although working simultaneously on the same land and at the same temperature, the various plow shares may meet with a greater or less resistance, owing to the fact that the soil may be more or less compact at various points on the surface to be plowed. Moreover the shares may meet with obstacles such as stumps of trees, roots, stones, or the like.

It follows from this that the resistance to the forward motion of a multiple plow varies, not for the totality of the working parts but for each of these parts, as the nature of the ground may vary from one furrow to another, as hereinbefore set forth.

Moreover the construction of multiple plows is very complicated. In particular the devices for regulating the depth of the furrows, and also the height of the wheel that runs in the furrow, besides being complicated, are difficult to adjust.

Furthermore the beams supporting the various plow frames form, with the supporting axle, a unit which is rigid, and consequently indeformable and incapable of adapting itself to the unevennesses of the ground. Of course the bottom of the furrow need not be an exact reproduction of the sinuosities of the surface, but if the wheel rides over an obstacle or falls into a hole these movements ought to be absorbed, not by the rigid unit consisting of the parts of the plough assembled together to form the frame, but rather by a suitably arranged damper.

Furthermore when the plow is virtually integral with the tractor there is no traction damper, and this considerably augments the force necessary for starting, while a damping device would allow this force to be considerably reduced, at the same time insuring longer life for the parts of the plow.

Finally if the plow is mounted directly on a tractor, and forms a four-wheeled unit, the latter is absolutely rigid, and when the bodies are in operation, it becomes absolutely impossible to guide the machine, as the resistance produced by the plow shares engaged in the ground opposes any lateral displacement of the said machine.

The present invention has for its object to provide a multiple plow, arranged in such a way as to remedy all the disadvantages hereinbefore set forth.

The plow according to the present invention is characterized by the fact that the bodies are connected to the supporting axle through the medium of connecting rods jointed at one end to supports virtually integral with this axle and at the other end to cross bars which are themselves jointed at their center to pivots.

By means of this arrangement the bodies are displaceable in a vertical plane by virtue of the pivoting of the connecting rods, and in a horizontal plane by virtue of the pivoting about the cross bars of a support in which the beams are engaged.

On the other hand, the pull on the totality of the bodies and the coupling of the latter being effected at a single point, it becomes possible to guide easily a plow unit comprising four wheels. Furthermore the pull is always normal.

The present plow is also characterized by the device permitting of the grounding and lifting of the bodies, as well as the vertical displacement of the wheel traveling in the furrow, the displacement of these members being effected simultaneously by operating the same hand wheel.

By way of example the invention is illustrated in the accompanying drawing, in which:—

Figure 1 shows an elevation, with parts in section, of a plow arranged according to the principle of the invention.

Fig. 2 is a corresponding plan.

Fig. 3 is a sectional plan on the line A—A of Fig. 1.

Figs. 4 and 5 are two cross-sectional elevations on the lines B—B and C—C of Fig. 1.

Fig. 6 is a cross-sectional elevation on the line D—D of Fig. 2.

Figs. 7 and 8 are two longitudinal sectional elevations on the lines E—E and F—F of Fig. 2.

It will be seen from the drawing, that the present plow comprises a supporting axle $a$ mounted on two wheels $b$ and $b'$. The height of the wheel $b'$, which has to travel on the land, is invariable with respect to the axle.

The wheel $b$, which has to run in the furrow, is displaceable vertically. With this end in view the axle journal $c$ of this wheel is virtually integral with a sliding block $c'$ which is threaded internally to form a nut and is displaceable in a guide $c^2$ formed in a vertical support $a'$, integral with the axle $a$. In this nut $c'$ is engaged a screw $c^3$ to which is fixed a worm wheel $d$ gearing with a worm $d'$ virtually integral with a shaft $d^2$, capable of being operated by means of a hand wheel $d^3$ (Figs. 2 and 6).

Symmetrically to the support $a'$ the axle $a$ carries a second support $a^2$, provided with two forks $e$ and $e'$. The support $a'$ is provided with two horizontal pivots $e^2$ and $e^3$, (Fig. 6). In the forks $e$ and $e'$ and onto the pins $e^2$ and $e^3$ are jointed at one of their extremities connecting rods $f$, $f'$, $f^2$, $f^3$, arranged in twos one above the other. These connecting rods are jointed at their other ends to two cross bars $g$ and $g'$, each provided at the middle with an eyelet hole $g^2$ in which is engaged a pivot $h$ about which the corresponding cross bar can oscillate (Fig. 5.)

The two pivots $h$ are virtually integral with a metal support $h'$ in which are engaged the beams $i$ supporting the plow shares $i'$ (two in number in the example illustrated).

The connecting rods $f$, $f'$, $f^2$, $f^3$ being of the same length, the whole is always displaced in a vertical plane, whether to lift the shares or to lower them or force them into the earth.

This depth or vertical adjustment of the plow is effected, as shown in Fig. 1, by means of a toothed sector $j$ virtually integral with the connecting rod $f^2$ and gearing with a worm $j'$ carried by a shaft $j^2$ to which is keyed a worm wheel $j^3$. The latter gears with a worm $d^4$ mounted on the shaft $d^2$, which also carries the worm $d'$ controlling the wheel $b$, so that the working of the hand wheel $d^3$ fixed onto this shaft permits of the simultaneous adjustment of the height of the said wheel and of the bodies.

As hereinbefore stated the beams $i$ of the plow are engaged in a support $h'$ carrying the pivots $h$.

This support is provided for this purpose with bores $k$ in which the beams can slide. In each bore is arranged a coil spring $k'$ bearing upon a ring $k^2$, which is fixed by means of a safety peg onto the corresponding beam, through the medium of which the body is connected to the support $h$.

Each spring $k'$ constitutes a traction damper for the corresponding plow body, which is displaceable independently of the others, in a longitudinal plane, in the event of it meeting with any obstacle in the ground.

In the event of this obstacle not being able to be overcome the safety peg breaks, and the plow share leaves its support, without compelling the tractor to become embedded in the ground through skidding.

The beams are also displaceable in a horizontal plane by the pivoting of the support $h'$ about its trunnions $h$.

It therefore becomes possible with this device to guide the plow, even if it constitutes, with its traction device, a four-wheeled agricultural machine, the lateral displacement of the bodies being independent of the position of the supporting axle of the plow.

Moreover the deadening of the shocks is supplemented by means of the arrangement of the connecting rods $f$, $f'$, $f^2$, $f^3$, which consists of two parts capable of sliding one in the other, and inside of each of which is arranged a damping draw spring $m$, (Fig. 7).

It will be observed from the description set forth that the present plow presents the following main advantages.

(1) A single operating hand wheel enables the height of the plow bodies and of the wheel running in the furrow to be adjusted simultaneously.

(2) The frame supporting the plow bodies is not rigid, but on the contrary is capable of being resiliently displaced in a vertical plane and in a horizontal plane.

(3) However many plow bodies there may be, the pull on the latter is only exerted at a single point, located in the medial plane of the machine which allows of a pivoting and of a lateral displacement of these bodies.

(4) Each plow body is provided with a traction damper capable of acting independently of those of the other bodies, this damper being combined with a safety peg which breaks when the obstacle cannot be surmounted, in order to prevent the tractor from skidding.

(5) Finally the plow bodies are connected together by means of an arrangement of jointed connecting rods enabling these bodies to be simultaneously raised or lowered.

The present plow may be moved by mechanical traction or by animal power. With this end in view the supporting axle $a$ is provided with a coupling device adapted to the type of traction selected.

In the example illustrated this coupling device consists of two longitudinal bearers $n$ connected together by means of a cross bar $n'$ (Fig. 2).

The devices described above are also applicable to balance plows, to the plows called "Belgian plows," and in general to all single or multiple plows.

The above arrangements are only given by way of example, and the forms, dimensions and devices of detail may be varied according to circumstances without departing from the principle of the invention.

What I claim and desire is to secure by Letters Patent of the United States is:—

1. A multiple plow comprising a supporting axle for the plow bodies, wheels supporting the said axle, plow bodies each connected to the supporting axle by pivots for enabling the body to move laterally independently of the position of the axle, a device including a hand wheel for controlling the grounding and lifting of the plow bodies and the vertical displacement of the wheel traveling in the furrow, and a damping spring connecting each plow body to its support for allowing the longitudinal displacement of this body independently of the others.

2. A multiple plow comprising a supporting axle for the plow bodies, wheels supporting the said axle, plow bodies connected to the axle by connecting rods jointed to supports integral with the axle and to cross bars jointed at their center to pivots integral with a support provided with bores in which are engaged the beams of the plow bodies, damping springs connecting each plow body to the support and engaged in the bores of the latter, and means for effecting the simultaneous grounding or lifting of the plow bodies and of the wheel traveling in the furrow.

3. A multiple plow comprising a supporting axle for the plow bodies, wheels supporting the said axle, plow bodies connected to the axle by connecting rods jointed to supports integral with the axle and to cross bars jointed at their center to pivots integral with a support provided with bores in which are engaged the beams of the plow bodies, damping springs connecting each plow body to the support and engaged in the bores of the latter, a device for the simultaneous lifting and grounding of the plow bodies and of the wheel traveling in the furrow, this device comprising a shaft actuated by a hand wheel and carrying two worms gearing with pinions one of them driving a screw threaded rod engaged in a sliding block which forms a nut and carrying the wheel, the other driving a shaft provided with a worm gearing with a section integral with one of the connecting rods.

This foregoing specification of my "improvements in or relating to a multiple plow," signed by me this 17th day of April 1918.

CHARLES MARIUS MOTTE.

Witnesses:
CHAS. P. PRESSLY,
FRANÇOIS WEBER.

Copies of this patent may be obtained for five cents each, by addressing the "Commissioner of Patents, Washington, D. C."